(12) United States Patent
MacPhail

(10) Patent No.: US 6,597,377 B1
(45) Date of Patent: Jul. 22, 2003

(54) WEB LINKS OBJECTS

(75) Inventor: Margaret Gardner MacPhail, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 929 days.

(21) Appl. No.: 08/806,274

(22) Filed: Feb. 25, 1997

(51) Int. Cl.[7] .................................................. G09G 5/00

(52) U.S. Cl. ...................................... 345/738; 345/713

(58) Field of Search ................................ 709/300, 302, 709/303, 200, 315–320; 345/713, 738

(56) References Cited

U.S. PATENT DOCUMENTS 5,787,440 A * 7/1998 Bakke et al. ................ 707/103
5,835,758 A * 11/1998 Nochur et al. .............. 707/102
5,913,033 A * 6/1999 Grout .......................... 709/200

OTHER PUBLICATIONS

Hyperweb: A Framework for Hypermedia–Based Environments, Ferrans et al. 12/92, ACM, p. 1–10.*

* cited by examiner

Primary Examiner—St. John Courtenay, III
(74) Attorney, Agent, or Firm—Thomas E. Tyson; Leslie A. Van Leeuwen; Bracewell & Patterson, L.L.P.

(57) ABSTRACT

A method of providing information about a set of interrelated objects or files on one or more servers in a computer network, such as pages on the Internet's world wide web. The method involves construction of a web links object that contains information regarding the links between the various web pages. When a user at a workstation sends a request for a specific web page (designating a particular universal resource locator), the server instead transmits the web links object to allow the user to see the hierarchy of the web site before downloading the contents of the web pages. The server can store the links object (such as one created by the web site designer), or can dynamically create a web links object upon request by analyzing the links in the various web pages. Alternatively, the workstation can perform the analysis and construct the web links object.

22 Claims, 5 Drawing Sheets

WEB LINKS OBJECTS

BACKGROUND OF THE INVENTION

1. Field of the Invention

The present invention generally relates to computer systems and, more particularly, to a method and device for examining interrelated objects on a computer network. The present invention is adapted for use with the Internet's world wide web, but it is generally applicable to any network which provides files or "pages" having links that allow retrieval of other pages.

2. Description of the Prior Art

A generalized client-server computing network 2 is shown in FIG. 1. Network 2 has several servers 4, 6, 8 and 10 which are interconnected, either directly to each other or indirectly through one of the other servers. Each server is essentially a stand-alone computer system (having a processor, a memory device, and a communications device), but has been adapted (programmed) for one primary purpose, that of providing information to individual users at client workstation 12. Workstation 12 can also be stand-alone computer systems, or "dumber" systems adapted for limited use with network 2. The information provided can be in the form of programs which run locally on a given workstation 12, or in the form of data such as files used by other programs. Users can also communicate with each other in real-time as well as by delayed file delivery, i.e., users connected to the same server can all communicate with each other without the need for the network 2, and users at different servers, such as servers 4 and 6, can communicate with each other via network 2. The network can be local in nature, or can be further connected to other systems (not shown) as indicated with servers 8 and 10.

The construction of network 2 is also generally applicable to the Internet. Conventional protocols and services have been established which allow transfer of various types of information, including electronic mail, simple file transfers via FTP, remote computing via TELNET, gopher searching, Usenet newsgroups, and hypertext file delivery via the world wide web. A given server can be dedicated to performing one of these operations or running multiple services. Internet services are typically accessed by specifying a unique address, or universal resource locator (URL). The URL has two basic components, the protocol to be used, and the object pathname. For example, the URL "http://www.uspto.gov" (home page for the U.S. Patent and Trademark Office) specifies a hypertext transfer protocol ("http") and a pathname of the server ("www.uspto.gov"). The server name is associated with a unique numeric value (TCP/IP address).

The present invention relates to examination of interrelated files on a network like the Internet, but is particularly applicable to the world wide web, which provides files that are conveniently linked for user access. For example, as illustrated in FIG. 2, a group 14 of files or "pages" 16a–16h are interrelated by providing hypertext links in each of the files. A hypertext link is an image that is viewable on the workstation's display 18, which can be selected by the user (e.g., using a pointing device or "mouse") and which then automatically instructs client workstation 12 to request another page associated with that particular hypertext link (i.e., issue another URL). A hypertext link may appear as a picture or as a word or sentence, possibly underlined or otherwise accentuated to indicate that it is a link and not just normal, informative text.

A world wide web page may have text, graphic (still) images, and even multimedia objects such as sound recordings or moving video clips. A hypertext page, if more than just text, is usually constructed by loading several separate files, e.g., the hypertext file "main.html" might include a reference to a graphic image file "picture.gif" or to a sound file "beep.wav." When a client workstation 12 sends a request to a server for a page, such as page 16a, the transmits (at least partially) the main hypertext file associated with the page, and then loads, either sequentially or simultaneously, the other files associated with the page. A given file may be transmitted as several separate pieces via TCP/IP protocol. The constructed page is then displayed on the workstation monitor 18 as shown in FIG. 2. A page may be "larger" than the physical size of the monitor screen, and techniques such as scroll bars are used by the viewing software (the web browser) to view different portions of the page.

As also shown in FIG. 2, the interrelated files usually have a hierarchy wherein one page (16b) appears to be the main page, i.e., at the root of the tree-like structure of linked files. This main page is often referred to as a "home" page for that set of files. For example, a set of pages (web site) dealing with technical support for a particular computer hardware system might have a home page with general information on the computer manufacturer and links to other, more detailed pages that discuss specific hardware components. The pages and their links are created by a programmer who is referred to as a webmaster. Sometimes a webmaster will place a hypertext link in a web page that allows the user to return directly to the home page, but often there is no indication of where a particular page is located with respect to the hierarchy of interrelated files, nor any simple link for moving back (up) toward the home page. For example, in FIG. 2, if page 16a is first retrieved (before retrieving home page 16b) then the user may not be aware that there is a home page which might be more useful in directing the user to desired information or point of interest.

This lack of orientation can make navigation of the world wide web more difficult, requiring the user to go up and down a certain number of links before the desired information is finally found. For this and other reasons, it is often difficult to find a particular web page. Some Internet services such as Yahoo have organized links under topics of information which helps, but most web pages just have flat lists of page links. Even designers of services like Yahoo are at a disadvantage because they do not have the original webmaster's information plan for each site 14. Links typically do not follow an organized, directory-like structure. It would, therefore, be desirable to provide a more organized approach to examining and navigating web pages. It would bed particularly advantageous to devise a method which allows visibility of the site hierarchy.

SUMMARY OF THE INVENTION

It is therefore one object of the present invention to provide a method of examining a set of objects on a computer network, such as web pages, which are interrelated by links between the objects.

It is another object of the present invention to provide such a method which imparts the relationship of the linked objects, including identification of the primary object (home page), if any.

It is yet another object of the present invention to provide such a method which simplifies navigation among a set of such interrelated objects.

The foregoing objects are achieved in a method of examining interrelated objects residing on one or more servers on a computer network (such as pages on the world wide web), generally comprising the steps of creating a links object having information on links between the interrelated objects, requesting (by a client workstation) one of the interrelated objects, and in response to the request, loading the links object on the client workstation. The links object information establishes a relationship of the interrelated objects, preferably indicating the main object of the object set (home page of the web site). The links object can further be designed to allow quick determination of what the link nodes contain, e.g., by providing titles indicating the contents of the nodes. The web links object can be created prior to the workstation request (such as by the web site designer) and stored on one of the servers, or the server can dynamically create the web links object by analyzing the interrelated objects. Alternatively, the workstation can perform the analysis to dynamically create the links object. A web links object can include nested links objects. The method of the present invention offers several advantages to different service providers on the network, to the end user, and to the web site designer by allowing each of them to refer to the original web site architecture when searching for information.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF THE PREFERRED EMBODIMENT

Figure 1:
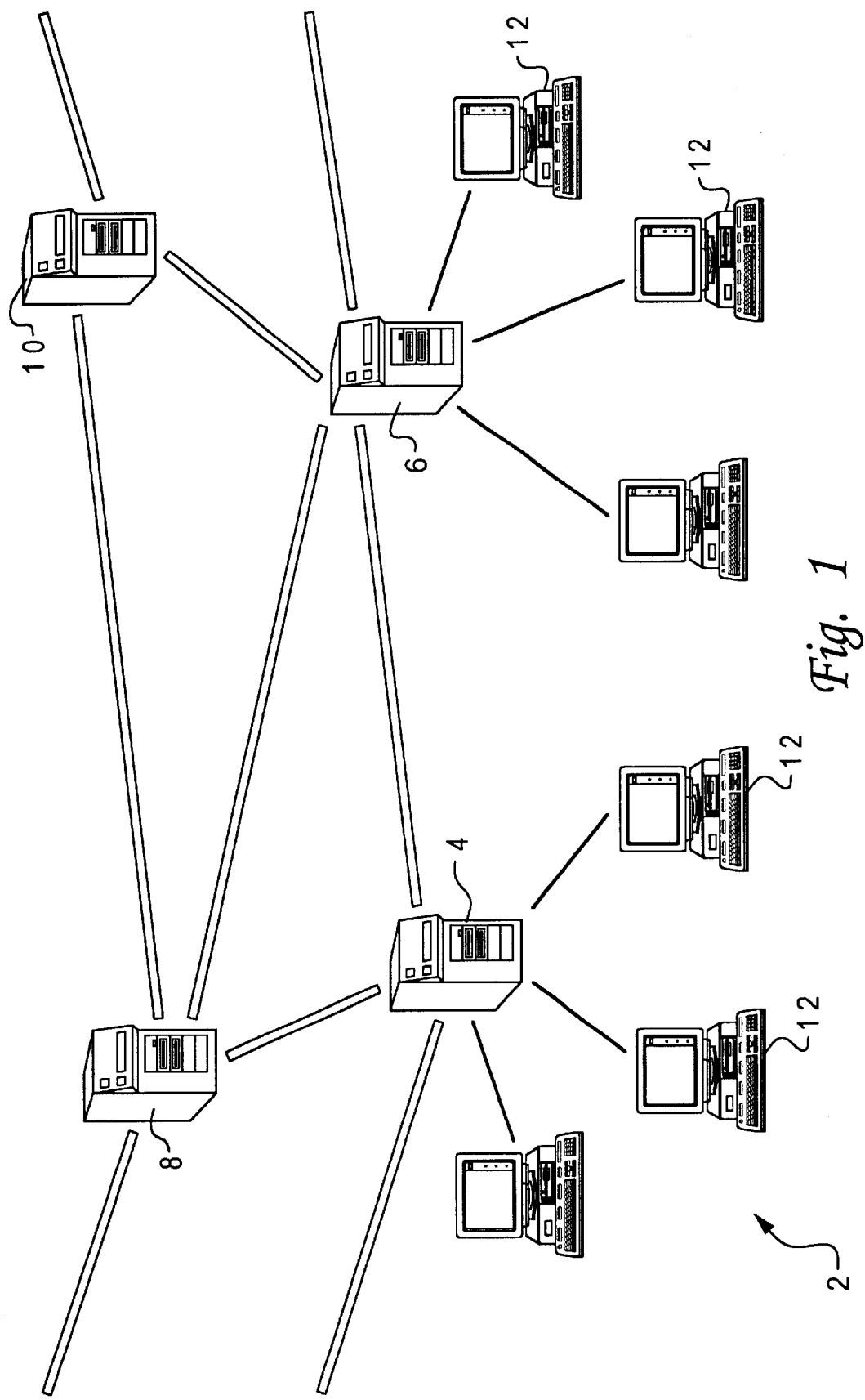
FIG. 1 is a diagram of a conventional computer network, including interconnected servers and client workstations.
Figure 2:
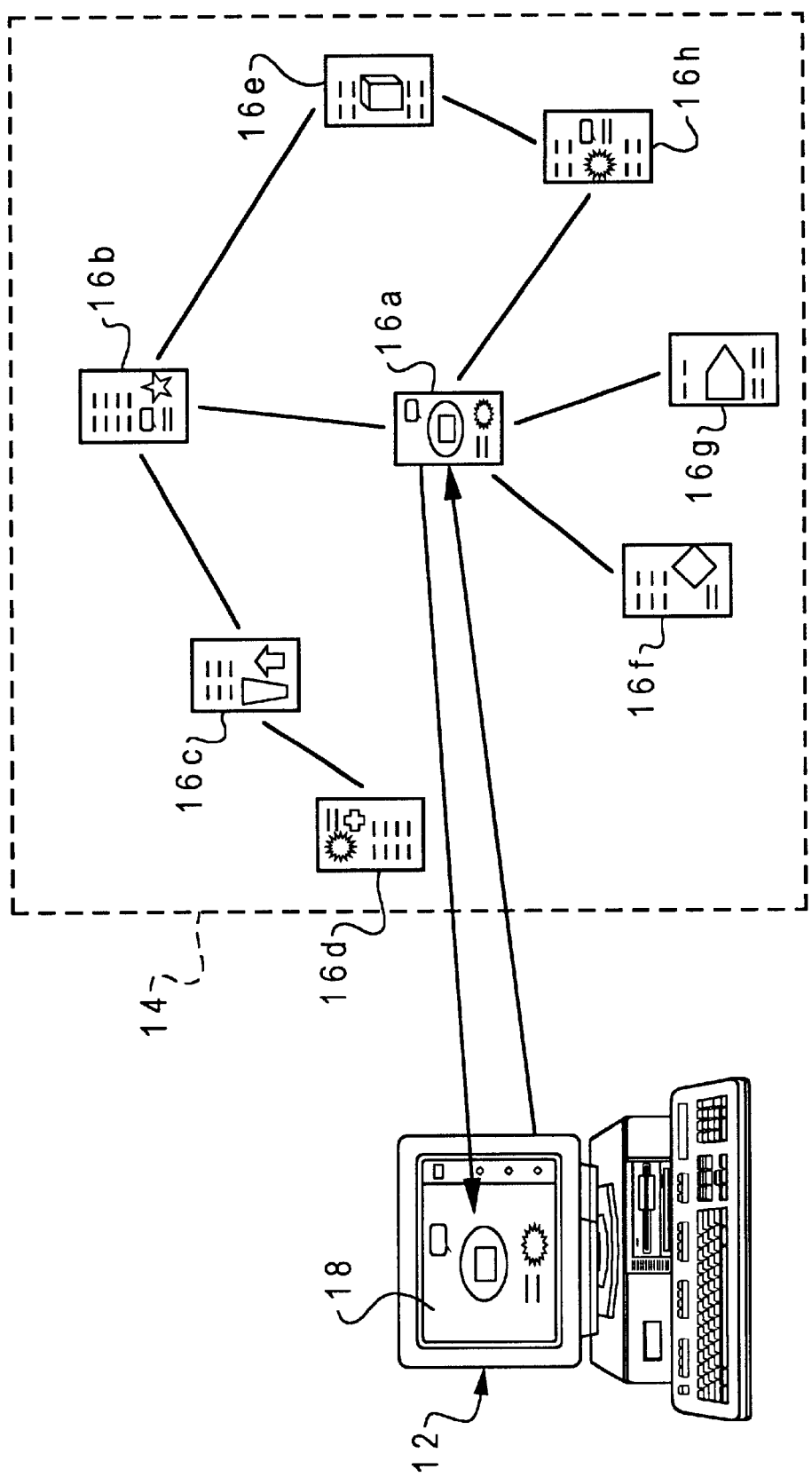
FIG. 2 is a representation of retrieval of an object from a set of linked objects residing on the network, such as a page on the world wide web.

The present invention is directed to a method of examining objects, such as files or "pages" residing on a computer network like the one shown in FIG. 1, which are interrelated by links, particularly by hypertext links such as those used with the world wide web. The invention requires the creation of a "web links object" which contains information on how the object or web pages are linked. The web links object may also reflect information on the relationship between the objects, such as by providing titles or labels associated with each object. The web links object may generally be created in one of three different ways: (i) prior to any request for an interrelated object, such as by the webmaster during creation of the web site; (ii) dynamically by the server receiving such a request; or (iii) dynamically by the client workstation.

Figure 3:
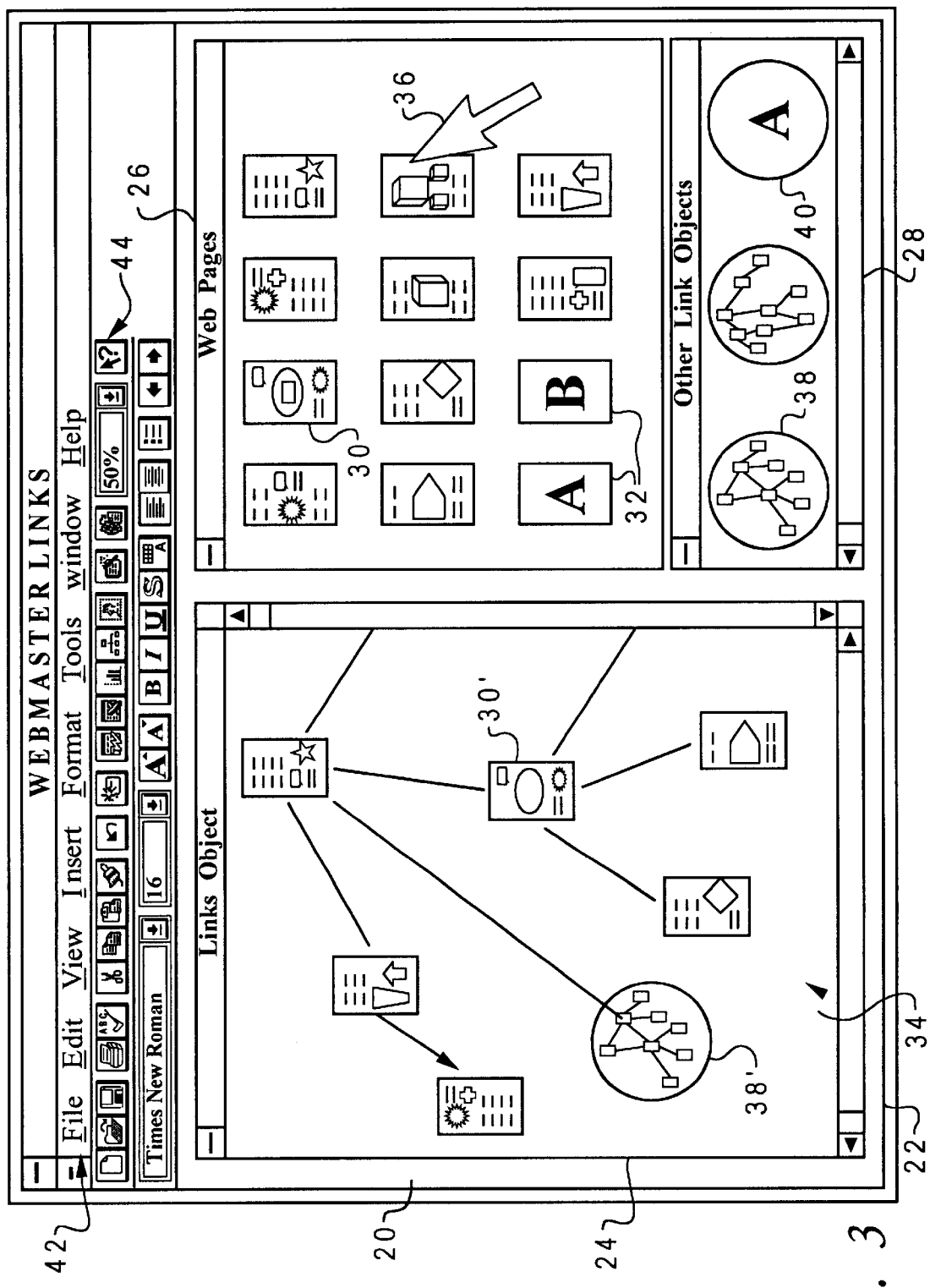
FIG. 3 is an illustration of a computer display showing a novel software tool for creating a links object which identifies how interrelated objects on the network are linked together.

One manner of creation of a web links object according to the former method is illustrated in FIG. 3, which depicts a computer screen 20 displaying a program window 22 corresponding to a web site creation tool. The authoring tool provides a mechanism to organize web pages which results in the dynamic creation of the web link object, and uses a number of smaller (child) windows within program (parent) window 22, including a web links object window 24, a web pages window 26, and a window 28 for other web links objects. The programmer (webmaster) begins by creating two or more web pages using conventional methods, such as writing a file with a text editor in Hypertext Markup Language, or HTML; a web page can also be a binary file, such as a graphic-type image (e.g., a GIF file). These web pages do not need to be complete, and actual links to other objects (HTML pages, GIF files, etc.) need not be embedded in the pages at this time. Some pages may not have embedded links (those at the end of a chain, which are only linked to, not from). The partial web pages are depicted graphically as icons in window 26, such as web page 30. Dummy (empty) web pages 32 can also be used, which can be filled in later.

The web links object 34 can be constructed by various means, including a "drag-and-drop" operation, wherein one of the iconic representations is selected by a graphical pointer 36 (controlled by a pointing device or "mouse" connected to the webmaster's workstation) and copied into window 24. The home page would typically be copied into window 24 first, and then any pages which have links in the home page would be dragged-and-dropped onto the home page; the software would automatically add the linked pages as icons, such as 30', with appropriate labels or titles, as node points with lines to illustrate the links. Arrowheads on the lines in web links object 34 may be used to indicate whether there is a one-way link or a two-way link between two pages. The inclusion of a page 30' in web links object 34 does not mean that any of the contents of the web page have been incorporated; rather, only the page's URL is included in the web links object.

In addition to depicting pages, the web links object 34 may also refer to other web links objects instead of a specific URL, i.e., web links objects can be nested. Window 28 includes iconic representations 38 of other web links objects (i.e., related web sites) that have been created by or imported into the web site authoring tool. Any of these other web links objects may be similarly added to the web links object 34 under construction, e.g., by drag-and-drop, to create an image 38' in web links object 34. Dummy web links objects, such as 40, can also be used.

The web site authoring tool may include other conventional components, such as a pull-down menu bar 42 and a tool bar 44. These components as well as the above-described features can be provided by conventional computer-programming methods upon reference to this description.

Figure 4:
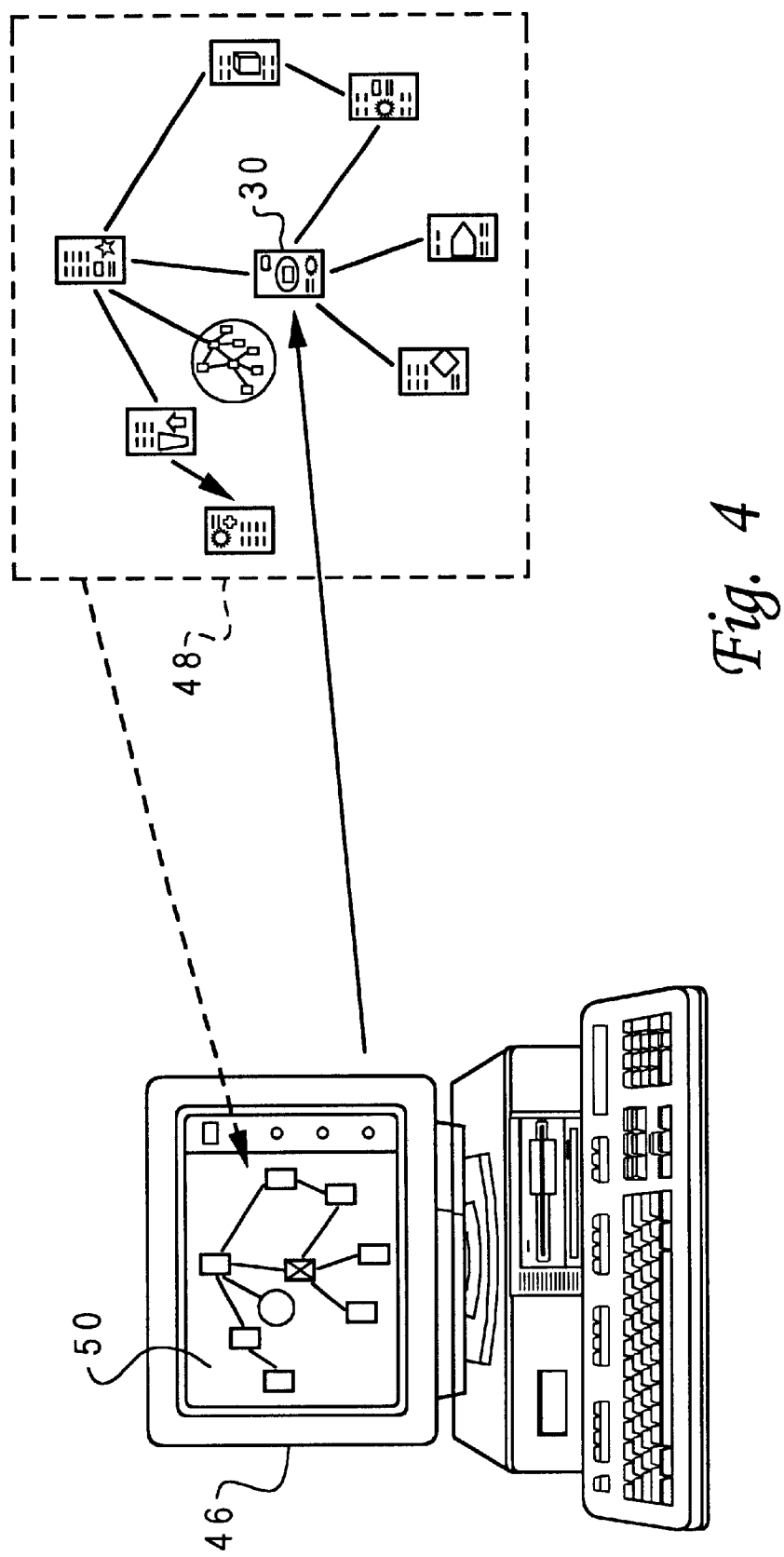
FIG. 4 is a representation of retrieval of a web links object in response to a request for a page on the world wide web.

When the web links object 34 is complete, it is stored on at least one network server (on the permanent memory device, or cached), and preferably on each server that has any HTML file that is part of the web site. Then, as shown in FIG. 4, when a "general" request is made by a workstation 46 for a page 30 in the web site 48, the server does not send that page, but rather sends the associated web links object 34, which is displayed on monitor 50. Workstation 46 is similar to workstation 12 (and at least has a processor and local memory (cache or hard drive) for storing retrieved information), but additionally has novel browser software that makes the "general" request to the server in such a manner (protocol) that the server recognizes the workstation would rather have a web links object returned than the actual page specified by the requested URL. Such functionality can easily be added to server and workstation software by conventional programming techniques upon reference to this description. This method can be refined in a number of ways, for example, by including parameters to tailor the returned outline by the type of link (only a selected type or list of types, like graphic (GIF or JPG) files), or limiting the depth of nested web links objects. The user can then quickly scan the entire web site organization and access the objects referenced by the links, e.g., by pointing and clicking at the web page icons in the web links object. Labels or page titles can be associated with the links to indicate the general content or nature of the particular object. Such a request would be "specific" in the sense that the server would recognize that it is being requested to send only the requested object (URL) and not any associated web links object. A server can be programmed to respond to such "general" and "specific" requests in accordance with the present invention, while still handling conventional protocol requests from non-compliant browsers by simply delivering the requested object and ignoring the web links object. Alternatively, a "specific" request may simply be made by using a conventional protocol, i.e., even though the workstation can support web links objects, the server will presume the workstation is non-compliant and so will send the specifically requested object.

Figure 5:
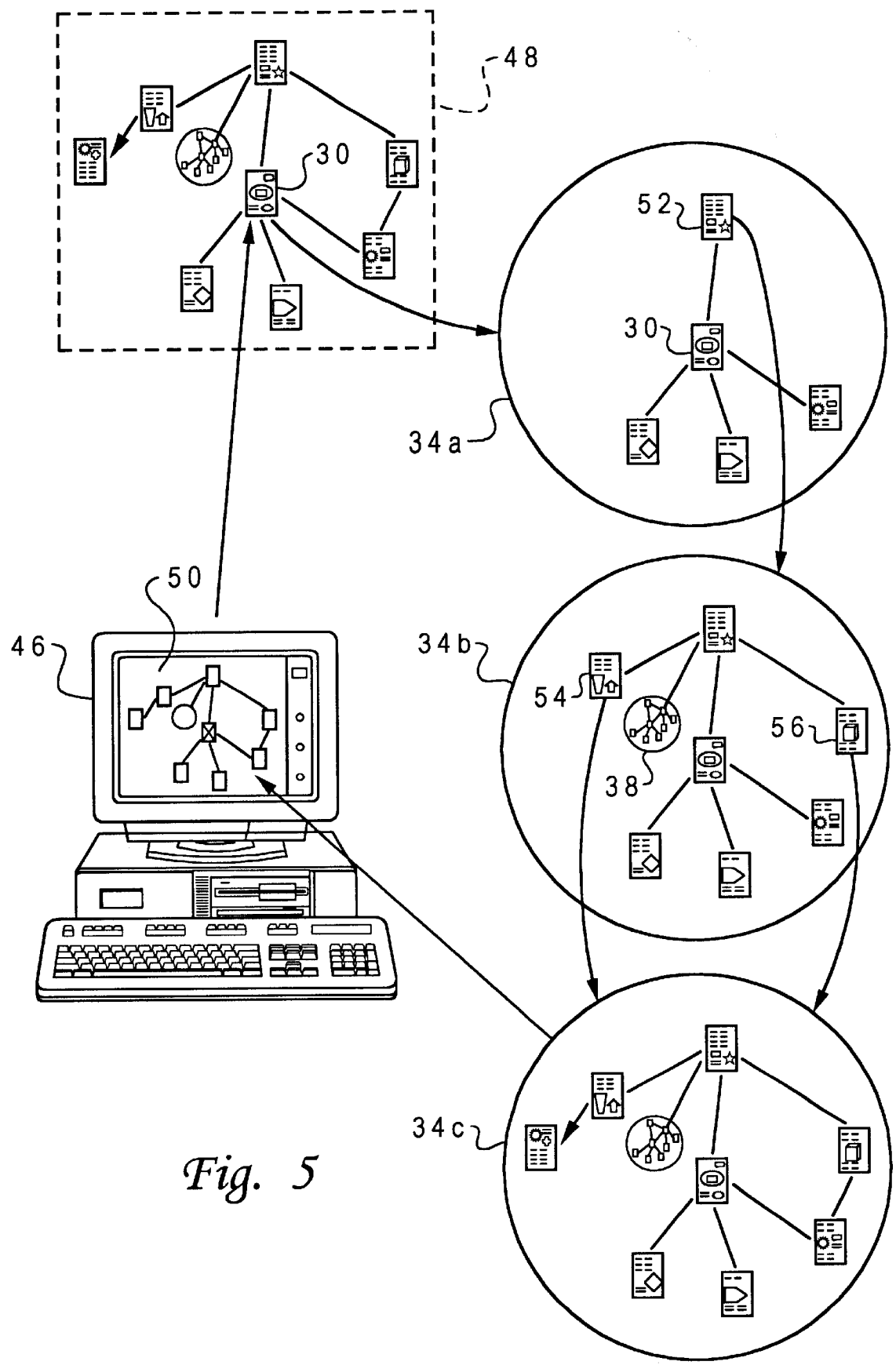
FIG. 5 is an illustration of how a client workstation can build a web links object by examining links in the different web pages.

If a webmaster does not provide a web links object for a particular page, one can be created dynamically upon receiving a request for the page by analyzing the web page to identify its links, and then similarly analyzing the referenced links. As shown in FIG. 5, after workstation 46 sends the URL for page 30, the contents of page 30 are examined to reveal a first set of links, allowing construction of a preliminary web links object a which includes another page 52. When page 52 is examined, additional links to pages 54 and 56 are found, and another link is found to what appears to be a separate web site 38 (e.g., on another server). These results are added to modify the web links object as shown at b. Finally, examination of pages 54 and 56 reveal one additional page and an additional link to an existing page. These results are finalized in web links object 34c, which is then loaded on workstation 46 and displayed on screen 50. This analysis can be much more extensive if the web site contains many pages and links.

The dynamic analysis to construct the web links object may be performed by the workstation, but it is preferably performed by the server to avoid unnecessary transmission of HTML files. A CGI (Common Gateway Interlace) program can be used at the server to generate an ad hoc HTML page which contains an HTML version of the graphical outline of the links including relevant labels and titles. Boundaries may be established for a given web links object by using, e.g., naming conventions (such as limiting the web links object to links which reside on a particular server or in a particular directory. The program can again tailor the returned page by, e.g., the type of link. If the server cannot perform this analysis, the workstation can construct the web links object. Although this takes more time, since all of the HTML files for all interrelated objects must be transmitted across the network to the workstation, it takes much less time than would be required to fully download all pages since it is not necessary to transmit non-HTML files (i.e., those files not having embedded links, such as GIF files), and since there is no processing time required for displaying the downloaded HTML files (they can be analyzed without being displayed on screen 50). Timeout limits can be set for retrieving HTML files, with corresponding dummy pages being shown in the web links object. Even if the web site is extensive, it may still benefit the user to wait for the web links object to be constructed, and the user can step away from the computer to perform other tasks (or run other programs on the workstation) while the analysis is being performed.

The method of the present invention offers several advantages to different services offered on the network, to the end user, and to the webmaster. Web services, during search and organization of web pages throughout the Internet space, can copy and save page information at the web links object level instead of individual pages. The web service, such as Yahoo, can then display the web links object titles (a Reuter's web links object, a CNN web links object, a USA Today web links object, etc.), or display web links object details, and the web links objects can be passed to a web browser. The user (web browser) can receive and understand a web links object, use the web links object to display the graphical outline of the links including relevant labels and titles, and quickly access the objects referenced by the links, taking advantage of the well-thought-out arrangement. If the desired information is not there, the user wastes no further time following links. The webmaster can use the web links object to protect and preserve the integrity of the design of web pages. The web links object can also be used by the web server and its products that keep organizational links to minimize churn.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. For example, the present invention is applicable to other networks besides the Internet, including "intranets." It is therefore contemplated that such modifications can be made without departing from the spirit or scope of the present invention as defined in the appended claims.

What is claimed is:

1. A method of examining interrelated objects residing on one or more servers on a computer network, comprising the steps of:
   creating a links object having information on retrieval links between the interrelated objects, wherein a given one of the retrieval links is embedded within one of the interrelated objects;
   requesting one of the interrelated objects by a client workstation; and
   in response to said requesting of one of the interrelated objects, loading the links object on the client workstation.

2. The method of claim 1 wherein the links object information establishes a relationship of the interrelated objects.

3. The method of claim 2 wherein the links object information further establishes a main object associated with the relationship.

4. The method of claim 1 wherein said creating step occurs prior to said requesting step and the links object is stored on one of the servers.

5. The method of claim 1 wherein said creating step occurs after said requesting step and is accomplished by dynamically analyzing the interrelated objects.

6. The method of claim 5 wherein said creating step is performed by the client workstation.

7. The method of claim 5 wherein said creating step is performed by one of the servers.

8. The method of claim 1 wherein the links object information includes a second, nested links object having further information on links between another set of interrelated objects.

9. The method of claim 1 wherein the links object further provides links to access the interrelated objects.

10. The method of claim 1 wherein the links object information is limited to information regarding links to objects of a predetermined type.

11. An apparatus for providing information to a workstation connected to a network, the apparatus comprising:

means for communicating with the network;

a memory device having a plurality of objects interrelated by retrieval links; and a processor programmed to transmit a links object having information on said retrieval links between said interrelated objects, in response to a request from the workstation to send one of said interrelated objects, wherein a given one of the retrieval links is embedded within one of the interrelated objects.

12. The apparatus of claim 11 wherein said processor is programmed to transmit the links object only if said request is made according to a first protocol, and if said request is made according to a second protocol, said processor instead transmits said requested object.

13. The apparatus of claim 11 wherein said processor is programmed to dynamically analyze said interrelated objects, in response to said request, to create said links object.

14. The apparatus of claim 11 wherein said links object is stored prior to said request and said processor is programmed to retrieve said stored links object in response to said request.

15. A device for retrieving interrelated objects from a computer network, comprising:

memory means for storing the objects;

a video monitor for displaying the objects; and a processor programmed to send a request, in response to a user command, for one of the objects, said processor being further programmed to load, in response to said request, a links object associated with the requested object, said links object having information on retrieval links between the interrelated objects, wherein a given one of the retrieval links is embedded within one of the interrelated objects.

16. The device of claim 15 wherein said processor is programmed to send said request in either a first protocol or a second protocol, said first protocol designating a preference for any available links object associated with the requested object, and said second protocol designating a request only for the requested object.

17. The device of claim 15 wherein said processor is programmed to load said links object by receiving said links object from a server connected to said computer network.

18. The device of claim 15 wherein said processor is programmed to load said links object by first creating said links object by dynamically analyzing said interrelated objects.

19. A system for providing information to an end user, comprising:

a network with one or more servers having a plurality of objects interrelated by retrieval links; and a workstation, connected to said network, and programmed to send a request, in response to a user command, for one of the objects, said workstation being further programmed to load and display, in response to the request, a links object associated with the requested object, the links object having information on retrieval links between the interrelated objects, wherein a given one of the retrieval links is embedded within one of the interrelated objects.

20. The system of claim 19 wherein:

said workstation is programmed to send the request in either a first protocol or a second protocol, said first protocol designating a preference for any available links object associated with the requested object, and said second protocol designating a request only for the requested object; and one of said one or more servers is programmed to transmit the links object only if the request is made according to said first protocol and, if the request is made according to said second protocol, said server instead transmits the requested object.

21. The system of claim 19 wherein:

the links object is stored prior to the request in one of said one or more servers; and said workstation is programmed to load the links object by receiving the links object from said server.

22. The system of claim 19 wherein:

one of said one or more servers is programmed to dynamically analyze the interrelated objects, in response to the request, to create the links object.

* * * * *